Figure 1:
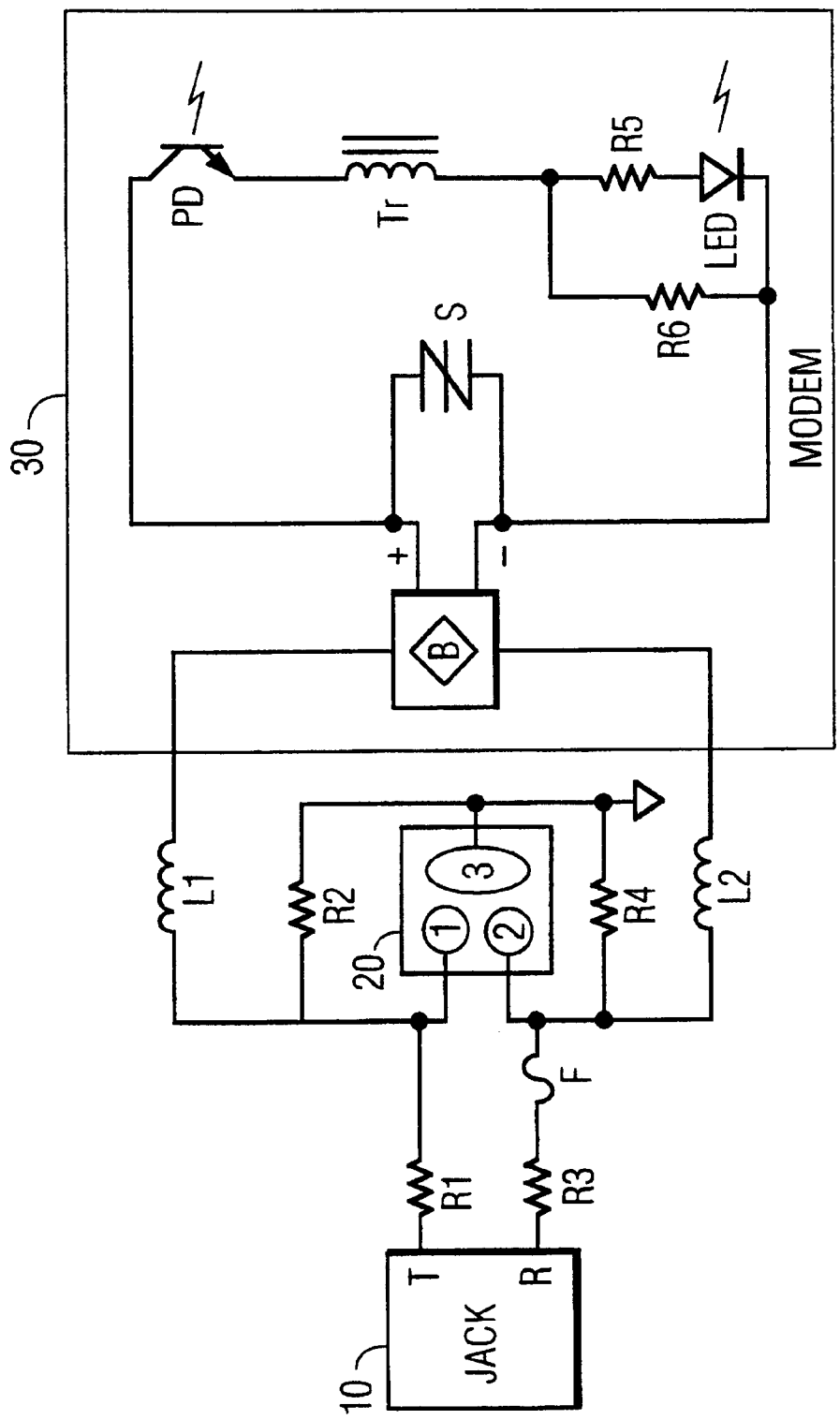

United States Patent
Pitsch et al.

[19]

[11] Patent Number: 6,163,447
[45] Date of Patent: *Dec. 19, 2000

[54] TELEPHONE EQUIPMENT PROTECTION CIRCUIT

[75] Inventors: Robert Alan Pitsch, Carmel; Charles Edward West, Brownsburg, both of Ind.

[73] Assignee: Thomson Licensing S.A., Boulogne, France

[ * ] Notice: This patent issued on a continued prosecution application filed under 37 CFR 1.53(d), and is subject to the twenty year patent term provisions of 35 U.S.C. 154(a)(2).

[21] Appl. No.: 09/091,334

[22] PCT Filed: Dec. 17, 1996

[86] PCT No.: PCT/US96/19932

§ 371 Date: Jun. 16, 1998

§ 102(e) Date: Jun. 16, 1998

[87] PCT Pub. No.: WO97/23987

PCT Pub. Date: Jul. 3, 1997

Related U.S. Application Data

[60] Provisional application No. 60/009,178, Dec. 22, 1995.

[30] Foreign Application Priority Data

Jan. 2, 1996 [GB] United Kingdom .................. 9600002
Jun. 28, 1996 [GB] United Kingdom .................. 9613608

[51] Int. Cl.⁷ .................................................. H02H 9/00
[52] U.S. Cl. ............................................................ 361/119
[58] Field of Search ..................................... 361/111, 117, 361/118, 119

[56] References Cited

U.S. PATENT DOCUMENTS

| | | | |
|---|---|---|---|
| 4,254,442 | 3/1981 | Dijkmans et al. | 361/56 |
| 4,586,104 | 4/1986 | Standler | 361/91 |
| 5,392,349 | 2/1995 | Elder, Jr. | 379/412 |
| 5,493,469 | 2/1996 | Lace | 361/119 |
| 5,621,602 | 4/1997 | Winkelmann | 361/104 |

FOREIGN PATENT DOCUMENTS

| | | | |
|---|---|---|---|
| 661397 | 7/1987 | Switzerland | H04M 1/74 |
| 92/06523 | 4/1992 | WIPO | H02H 9/00 |

OTHER PUBLICATIONS

WESCON '95 Conference Record. Microelectronics, Communications Technology, Producing Quality Products, Mobile and Portable Power, Emerging Technologies, San Francisco, Nov. 7–9, 1995, Institute of Electrical and Electronics Engineers, M. Williams et al. "Circuit Protection For Telephone Networks—Needs and Co–ordination", pp. 189–194.

*Primary Examiner*—Ronald W. Leja
*Attorney, Agent, or Firm*—Joseph S. Tripoli; Robert D. Shedd

[57] ABSTRACT

A circuit for protecting telephone/modem equipment from damage, includes a source of a subscriber telephone signal. An energy transfer device is coupled to the subscriber telephone signal source and an inductor coupled between the energy transfer device and the telephone/modem equipment.

17 Claims, 1 Drawing Sheet

TELEPHONE EQUIPMENT PROTECTION CIRCUIT

The present patent application claims priority of PCT application PCT/US96/19932 filed on Dec. 17, 1996 and provisional U.S. patent application Ser. No. 60/009,178 filed on Dec. 22, 1995.

The present invention relates to a circuit for protecting front end circuitry in telephone equipment from damage due to damaging signals, such as short circuits or lightning strikes, on the telephone line to which they are attached.

Present electronic equipment may include telephone equipment, such as modem circuitry, to access outside computers via the subscriber's telephone line. Such equipment is relatively expensive. However, a subscriber telephone line is subject to various signal conditions which can either damage telephone equipment attached to it, or seriously degrade the performance of that equipment. For example, electromagnetic interference (EMI) may be picked up by the telephone lines acting as antennae; or, if the telephone lines at the subscriber location are not grounded properly, a high voltage static charge may build up on those lines which will discharge when circuitry is connected to the telephone lines; or various other circuitry also coupled to the telephone line may malfunction and generate a signal having too high a voltage or a short circuit; or lightning may strike the telephone lines. In all of these cases, the telephone lines pick up a signal which, if transmitted to the telephone equipment connected to them, will damage that circuitry or degrade its performance.

In order to ensure protection for both telephone equipment and telephone lines against damage, various tests have been mandated in order to ensure that telephone equipment will continue to operate in the presence of such damaging signals. In the United States, for example, Underwriter's Laboratory has specified a series of test set forth in UL specification 1459, and the Federal Communications Commission has specified other tests in the FCC telephone equipment regulations, part 68. All equipment which is to connect to telephone lines must pass the tests set forth in these documents before they may be sold in the United States.

The tests set forth in these documents a re designed to protect telephone equipment from the various damaging signals which can occur on telephone lines. Furthermore, manufacturers, in order to minimize repair and warrantee repair expenses, and maximize consumer satisfaction with their equipment, desire to minimize damage to their equipment caused by such damaging signals. Furthermore, manufacturers include circuitry which will prevent signals which can degrade the operation of their telephone equipment from reaching that equipment.

Various protection circuits have been developed to protect telephone equipment from damaging or operation-degrading signals. This protection circuitry is coupled between a subscriber's telephone lines and the telephone equipment, and is designed to pass the required tests, as described above, and to protect the telephone equipment from damage or degraded operation. For example, in prior art protection circuits, inductors are coupled directly to the subscriber telephone lines. The inductors minimize or eliminate the EMI from entering the telephone equipment. In addition, the intent is that inductors prevent the damaging signals from passing through them. However, it has been found that inductors will not completely prevent high voltage spikes from passing through them and into the telephone equipment.

In order to prevent such high voltage spikes from passing through to the telephone equipment, some protection circuits further include a gasfilled spark gap between the inductors and the telephone equipment to transfer the energy in the high voltage spikes to ground, and thus prevent it from reaching the telephone equipment. However, once a high voltage spike has reached the gasfilled spark gap, some portion of that spike is able to adversely affect the telephone equipment.

It is desired to provide protection from both high voltage spikes and from EMI, and other damaging or operation-degrading signals. Preferably, protection circuitry should be provided which, though it may be destroyed when a damaging signal occurs, prevents the more expensive telephone equipment which it is protecting from being destroyed itself.

An example of a protection circuit employing a tripolar gas discharge tube and an inductor is described by Williams et al. in their article "Circuit protection for telephone networks—Needs and Co-ordination" which appears in the Wescon '95 Conference Record, Microelectronics, Communications Technology, Producing Quality Products, Mobile and Portable Power, Emerging technologies, San Francisco, Nov. 7–9, 1995, Institute of Electrical and Electronics Engineers, pages 189–194.

In an exemplary circuit described by Williams et al., tip and ring terminals are coupled directly to a tripolar gas discharge tube (having a nominal 420 volt trigger voltage) providing over-voltage protection between tip and ring and between tip and right to ground. A series connection of a PPTC resettable fuse, a resistor and an inductor couples each of the tip and ring terminals to a respective one of the subscriber's telephone equipment inputs and respective varistors in series with capacitors are connected between the telephone equipment inputs and ground.

Another example of protection apparatus utilizing energy transfer devices and inductors is described by Atkins in PCT international publication WO92/06523 entitled CIRCUIT PROTECTION DEVICE which was published Apr. 16, 1992. In this arrangement gas discharge tubes are connected directly from telephone line tip and ring terminals to ground and inductors couple the tip and ring terminals to further protection devices comprising voltage clamps or foldback devices coupled to ground and to the subscribers phone equipment.

A further example of protection apparatus is described by Page et al. in Swiss Patent CH 661 397 A5 entitled TELEPHONE SUBSCRIBER STATION WITH AN ELECTRONIC SWITCH CLOSING AND OPENING THE SUBSCRIBER LOOP which was published Jul. 15, 1987. In this system a gas filled overvoltage arrestor is coupled in series with a first voltage dependent resistor between the tip and ring terminals of the telephone line and the line terminals are coupled via a pair of inductors to respective inputs of a full wave bridge rectifier circuit having a second voltage dependent resistor connected to its output.

A last example of protection apparatus employing inductors and energy transfer devices is described by Lace in U.S. Pat. No. 5,493,469 entitled SURGE PROTECTION FOR DATA LINES which issued Feb. 20, 1996. In this system, the tip and ring terminals are connected directly to the user's phone equipment in parallel with a bridge rectifier having the output thereof connected to inductive and capacitive loads, each in series with a "breakdown" device.

It is herein recognized that a need exists for further improvement in telephone protection apparatus of the type described. It is one object of the invention to provide protection against static charge which may build up on a "floating" telephone line as may occur, illustratively, if the subscriber telephone line is not properly grounded at the subscriber and/or central office locations.

The principles of the invention have application to telephone protection apparatus for protecting telephone equipment (30), coupled to a subscriber telephone line (10), from damage, and of a type comprising: an energy transfer device (20) coupled between the subscriber telephone line (T,) and a source of reference potential; and an inductor (L1) coupled between the energy transfer device and the telephone equipment.

In accordance with the invention, the apparatus is characterized by a discharging circuit (R2) coupled in parallel with the energy transfer device (20) between the subscriber telephone line (T) and the source of reference potential for discharging a static charge from the subscriber telephone line to the source of reference potential.

In the drawing:

FIG. 1. is a schematic diagram of an telephone interface protection circuit according to the present invention.

In FIG. 1, a telephone jack 10, which may be a standard RJ11 telephone jack, is connected to a subscriber telephone line (not shown) in a known manner. A first terminal of the telephone jack 10, coupled to the tip signal T of the subscriber telephone line, is coupled to a first electrode of a first resistor R1. A second electrode of the first resistor R1 is coupled to respective first electrodes of a first inductor L1 and a second resistor R2, and to a first terminal 1 of a spark gap 20. A second electrode of the first inductor is coupled to a first input terminal of a modem 30 (described in more detail below). A second electrode of the second resistor R2 is coupled to a source of a reference potential (ground) and to a third terminal 3 of a spark gap 20.

A second terminal of the telephone jack 10, coupled to the ring signal R of the subscriber telephone line, is coupled to a first electrode of a third resistor R3. A second electrode of the third resistor R3 is coupled to a first electrode of a fuse F. A second electrode of the fuse F is coupled respective first input terminals of a second inductor L2 and a fourth resistor R4 and to a second terminal 2 of the spark gap 20. A second electrode of the second inductor L2 is coupled to a second input terminal of the modem 30. A second electrode of the fourth resistor R4 is also coupled to ground.

The first and second input terminals of the modem 30 are coupled to respective bidirectional terminals of a full-wave bridge circuit B. A sidactor® S is coupled between a positive voltage terminal + of the bridge circuit B and a negative voltage terminal − of the bridge circuit B. In addition, the positive voltage terminal + of the bridge circuit B is coupled to the negative voltage terminal − of the bridge circuit B by a serial connection of a photo-darlington pair PD, a transformer winding Tr, and the parallel connection of a fifth resistor R5 and an light emitting diode LED with a sixth resistor R6.

In operation, in the modem 30, the photodarlington pair PD is part of a solid state relay. The solid state relay also includes a light emitting diode (not shown) for controlling the conduction of the photo-darlington pair PD. The solid state relay is used to take the modem 30 off-hook and on-hook. The transformer Tr includes another winding (not shown) coupled to data processing circuits (not shown) of the modem 30. The transformer Tr is used to transfer data representative signals from the modem 30 to the subscriber telephone line and from the subscriber telephone line to the modem 30, in a known manner. The serial connection of the fifth resistor R5 and the LED, in parallel with the sixth resistor R6, is part of a opto-isolator which also includes a phototransistor (not shown). The sixth resistor R6 is used to lower the impedance presented by the fifth resistor R5 and LED. The optoisolator is used in conjunction with other circuitry (not shown) to measure loop current.

The photo-darlington pair PD, and the light emitting diode LED are unidirectional devices. However, it is not possible to predict which of the telephone lines, tip T or ring R. will be coupled to the positive voltage and which will be coupled to the negative voltage source in the subscriber telephone line. The bridge circuit B. which is a full-wave bridge circuit, e.g. fabricated from semiconductor diodes, is coupled to the tip signal T and the ring signal R to translate them to the proper polarity for use with the unidirectional photo-darlington pair PD and light emitting diode LED.

The unidirectional sidactor® (a registered trademark of Teccor Electronics, Inc.) S operates in a similar manner to a bidirectional DIAC. Specifically, it maintains a high impedance so long as the voltage across it remains below a predetermined trigger voltage. Once that trigger voltage is exceeded, however, the sidactor S becomes conductive, with a known voltage/current characteristic. This provides protection against over-voltage across the modem circuitry 30. In a preferred embodiment, the trigger voltage of the sidactor® is 275 to 300 volts.

The solid state relay, which includes the photo-darlington pair PD, the transformer Tr, and the opto-isolator which includes the light emitting diode LED, are relatively sensitive to over voltage. It is this circuitry which is protected by the remainder of the circuitry illustrated in FIG. 1.

Referring now to the portion of FIG. 1 between the telephone jack 10 and the modem 30. The first and third resistors, R1 and R3, respectively, provide current limiting on the current drawn from the subscriber telephone line. Furthermore, the values of the first and third resistors, R1 and R3, respectively, and the fuse F are coordinated to provide protection against long term short circuits while allowing operation of the protection circuitry to continue despite a short high voltage pulse (dealt with as described below). In a preferred embodiment, the first and third resistors, R1 and R3, respectively, are 10 ohm (Ω) resistors, and the fuse is a 350 milliampere (ma) fuse.

The second and fourth resistors, R2 and R4, respectively, are used to protect against static charge which may build up on a floating telephone line. This can happen, for example, if the subscriber telephone line is not properly grounded at the subscriber and/or central office locations. Any static charge on the subscriber telephone line is coupled to ground through the second and/or fourth resistors, R2 and R4, as soon as the telephone jack 10 is plugged into the subscriber telephone line, and any such charge is coupled to ground before it has a chance to build up so long as the telephone jack 10 remains plugged in. In a preferred embodiment, the second and fourth resistors, R2 and R4 are 10 MΩ resistors.

The spark gap 20 includes the first terminal 1 coupled to the tip signal, the second terminal 2 coupled to the ring signal, and the third terminal 3 coupled to ground. All of these terminals are mutually separated by respective air gaps having dimensions selected so that if the voltage between any two of them exceeds a predetermined voltage, the energy represented by that voltage is transferred by a spark between those terminals. Specifically, there are gaps between the tip signal T and ground, between the ring signal R and ground, and between the tip signal T and the ring signal R. These gaps are formed on a printed circuit board (PCB) by physically punching a gap in the PCB, and depositing a copper electrode on either side of the gap. This forms air-gap spark gaps, which are less expensive than gasfilled spark gaps. In order to provide a more mechanically sturdy spark gaps and increase the current which may be handled, in a preferred embodiment the copper electrodes on either side of the air gap on the PCB have chip resistors bonded to them which are then covered with solder. When a spark is generated, the solder melts temporarily, also improving the heat dissipation of the spark gap. In a preferred embodiment, the width of the air gaps is adjusted so that a spark is generated when the voltage across the gap is substantially between 2000 and 2200 volts.

The first and second inductors, L1 and L2, respectively, present a high impedance to signals at EMI frequencies and a low impedance to signals at the modem data frequencies. They are included to block such EMI signals from reaching or radiating from the modem 30. In addition, by placing the first and second inductors, L1 and L2, respectively, between the spark gap 20 and the modem 30, any high frequency, high voltage signals which either have been transferred to ground by the spark gap 20, or generated by the spark itself, are blocked from reaching the modem 30. In a preferred embodiment, the values of the first and second inductors, L1 and L2, respectively, are 5 micro henries ($\mu$h).

In the event of a damaging signal on the subscriber telephone line, the protection circuitry illustrated in FIG. 1 will either dissipate excess energy, or block that signal from reaching the relatively expensive circuitry in the modem itself. Some of the protection circuitry may be damaged or destroyed in the event of a particularly excessive damaging signal, such as a lightning strike. However, the damage caused by the lightning strike will be confined to the protection circuit. The arrangement according to the present invention, as illustrated in FIG. 1, placing the inductors between the spark gap and the telephone equipment will provide additional protection over prior art arrangements.

The embodiment of FIG. 1 illustrates protection circuitry for protecting a modem from damage. One skilled in the art will understand that the protection circuitry may be adapted to protect any telephone equipment from damage in accordance with the present invention. Furthermore, one skilled in the art will recognize that it is possible to include other protection circuitry to provide mandated protection for other telephone systems in other countries. For example, other circuitry may be required to provide mandated protection in accordance with IEC regulations for South America. Such circuitry has not been illustrated in FIG. 1, but one skilled in the art will understand what the requirements are, what circuitry is necessary to meet these requirements, and how to design and fabricate this circuitry and interconnect it with the circuitry illustrated in FIG. 1

"As described above, the spark gap 20 includes three individual gaps. As used herein and in the following claims, the identification of the individual spark gaps or "energy transfer devices" of spark gap 20 is identified by the terminal designators 1, 2 and 3. For example, terminals 1 and 3 form a first spark gap or energy transfer device. Terminals 2 and 3 form a second spark gap or energy transfer device and terminals 1 and 2 form a third spark gap or energy transfer device."

What is claimed is:

1. Apparatus for protecting telephone equipment, coupled to a subscriber telephone lines from damage, comprising:
    an energy transfer device coupled between the subscriber telephone line and a source of reference potential;
    an inductor coupled between the energy transfer device and the telephone equipment;
    a discharging circuit coupled in parallel with said energy transfer device for providing a first fixed resistance between the subscriber telephone line and the source of reference potential for discharging a static charge from the subscriber telephone lines to the source of reference potential which results from at least one of said subscriber telephone lines being ungrounded; and
    a resistor having a second fixed resistance coupled between the subscriber telephone line and the energy transfer device.

2. Apparatus as recited in claim 1 further characterized in that the discharging circuit is a linear circuit comprising a resistor.

3. Apparatus as recited in claim 2 further characterized in that the value of the resistor is in the meg-Ohm range.

4. The circuit of claim 1 wherein the energy transfer device comprises an air spark gap, which is configured to generate a spark when the voltage between the subscriber telephone line and the reference potential exceeds a predetermined trigger voltage.

5. The circuit of claim 2 wherein said energy transfer device includes a spark gap, which is configured so that the trigger voltage is substantially between 2000 and 2200 volts.

6. The circuit of claim 1 wherein said energy transfer device includes an air spark gap and further comprises a fuse coupled between the subscriber telephone line and the air spark gap.

7. A circuit for protecting telephone equipment having first and second input terminals, and coupled to first and second subscriber telephone lines from damage, comprising:
    a first energy transfer device coupled between the first subscriber telephone line and a source of reference potential;
    a first inductor coupled between the first energy transfer device and the first input terminal of the telephone equipment;
    a second energy transfer device coupled between the second subscriber telephone line and the source of reference potential;
    a second inductor coupled between the second energy transfer device and the second input terminal of the telephone equipment;
    a discharging circuit coupled between the first and the second subscriber telephone lines and the source of reference potential and having a first fixed resistance for discharging static charge from the subscriber telephone signal to the source of reference potential which results from at least one of said subscriber telephone lines being ungrounded;
    a first resistor having a second fixed resistance coupled between the first subscriber telephone line and the first energy transfer device; and
    a second resistor having a third fixed resistance coupled between the second telephone line and the said second energy transfer device.

8. The circuit of claim 7 wherein the discharging circuit is a linear circuit and comprises:
    a third resistor coupled between the first subscriber telephone line and the source of reference potential; and
    a fourth resistor coupled between the second subscriber telephone line and the source of reference potential.

9. The circuit of claim 8 wherein the values of both the third and the fourth resistor are in the meg-Ohm range.

10. The circuit of claim 7 wherein:
    the first energy transfer device comprises an air spark gap which is configured to generate a spark when the voltage between the first subscriber telephone line and the reference potential exceeds a predetermined trigger voltage; and the second energy transfer device comprises an air spark gap which is configured to generate a spark when the voltage between the second subscriber telephone line and the reference potential exceeds the predetermined trigger voltage.

11. The circuit of claim 10 wherein the first and second air spark gaps are both configured so that the predetermined trigger voltage is substantially between 2000 and 2200 volts.

12. The circuit of claim 7 further comprising a third energy transfer device coupled between the first subscriber telephone line and the second subscriber telephone line.

13. The circuit of claim 12 wherein the third energy transfer device comprises a third air spark gap which is configured to generate a spark when the voltage between the first subscriber telephone line and the second subscriber telephone line exceeds a predetermined trigger voltage.

14. The circuit of claim 13 wherein the third spark gap is configured so that the predetermined trigger voltage is substantially between 2000 and 2200 volts.

15. The circuit of claim 7 wherein said first energy transfer device including a first spark gap and said second energy transfer device including a second spark gap and a fuse coupled between one of the first and second subscriber telephone lines and a corresponding one of the first and second gaps.

16. The circuit of claim 7 wherein said first resistor is coupled between the first subscriber telephone line and the first energy transfer device; and further comprising a serial connection of said second resistor and a fuse coupled between the second subscriber telephone line and the second energy transfer device.

17. The circuit of claim 16 wherein the values of both the first and second resistors are relatively low range of a few Ohms.

* * * * *